(12) United States Patent
Mikulsky

(10) Patent No.: US 11,939,767 B1
(45) Date of Patent: Mar. 26, 2024

(54) METHOD AND APPARATUS FOR ATTACHING CAPS, TUBES, AND SEALS TO AN ANCHORAGE FOR A POST TENSIONING TENDON

(71) Applicant: P. T. Atlas Manufacturing LLC, Seagoville, TX (US)

(72) Inventor: Nate Mikulsky, Seagoville, TX (US)

(73) Assignee: P. T. Atlas Manufacturing LLC, Seagoville, TX (US)

( * ) Notice: Subject to any disclaimer, the term of this patent is extended or adjusted under 35 U.S.C. 154(b) by 0 days.

(21) Appl. No.: 17/965,063

(22) Filed: Oct. 13, 2022

Related U.S. Application Data

(60) Provisional application No. 63/262,463, filed on Oct. 13, 2021.

(51) Int. Cl.
*B23P 19/027* (2006.01)
*B23P 19/02* (2006.01)
*E04C 5/12* (2006.01)

(52) U.S. Cl.
CPC ............ *E04C 5/12* (2013.01); *B23P 19/02* (2013.01); *B23P 19/027* (2013.01)

(58) Field of Classification Search
CPC .......... B23P 19/02; B23P 19/027; B23P 19/10
See application file for complete search history.

(56) References Cited

U.S. PATENT DOCUMENTS 4,945,621 A * 8/1990 Sugiyama ............... B25B 27/10
29/237

FOREIGN PATENT DOCUMENTS

EP          995538 A1 * 4/2000 .............. B23P 19/02

* cited by examiner

*Primary Examiner* — Christopher J Besler
(74) *Attorney, Agent, or Firm* — Richard A. Fagin

(57) ABSTRACT

A cap and tube or seal setting apparatus comprises an anchor holding fixture having a surface for receiving a post tension anchor. An actuator is operably mounted to one side of the anchor holding fixture and in some embodiments has a cap setter attached to a movable part of the actuator. In some embodiments a tube or seal holding fixture is mounted to a support base and disposed on an opposed side of the anchor holding device.

4 Claims, 1 Drawing Sheet

METHOD AND APPARATUS FOR ATTACHING CAPS, TUBES, AND SEALS TO AN ANCHORAGE FOR A POST TENSIONING TENDON

CROSS REFERENCE TO RELATED APPLICATIONS

Priority is claimed from U.S. Provisional Application No. 63/262,463 filed on Oct. 13, 2021 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of reinforced concrete structures. More specifically, the disclosure relates to apparatus and methods for affixing tendons to anchors and their attachments in post-tension reinforced concrete structures.

Anchorages for post-tensioning reinforcement tendons have been assembled using methods and apparatus known in the art by pulling a tendon through a fixed end anchor base into tension. Such assembly includes affixing locking wedges to the tendon, pulling the tendon through the fixed end anchor base into tension to seat the locking wedges in the anchor base, and then releasing the tension on the tendon. Such techniques, called "pull seating" were known to be used for fixed end anchors until the early 2000s. The foregoing anchor setting method provided a proof test for every assembled anchor and tendon prior to their placement in a concrete structure and subsequent application of structural forces to the concrete structure. The pull seating method advanced the use and efficacy of post-tensioned concrete structures based on established reliability of the anchorage. The anchorage, that is the assembled anchor and tendon, was formed by removing a portion of sheathing from a sheathed tendon, and positioning an anchor and locking wedges at and around the unsheathed part of the tendon. A gripping mechanism held the tendon in place while a hydraulic force either pushed the anchor, or pulled the tendon in opposite directions to a force equal to the load to be applied to the anchorage in a concrete structure.

Since the introduction of modern corrosion protection requirements for all anchorages, pull-seating has become impractical due to the relationships between the necessary length of bare strand (unsheathed tendon) adjacent to the anchor, the force required to affix the anchor, the required mass and structure of the apparatus to withstand the force, the length of available protective coverings, and the minimum overlap of tendon sheathing required by industry specifications and resulting building codes. The foregoing conditions resulted in fixed end anchors for structural applications being seated by an alternative, less reliable "push" method utilizing a pushing device (see, e.g., U.S. Patents issued to Sorkin U.S. Pat. Nos. 6,513,287 and 7,841,061). The method disclosed in the foregoing Sorkin patents requires the removal of only a much shorter section of sheathing, placement of the anchor and wedge into a holding block, inserting the tendon, and the application of force pushing on either the tendon, the wedges, or both. The performance deficiency of the foregoing disclosed method is that the seating of the wedge to the stranded tendon, and resulting resistance to pulling failure is not tested. The frequency of tendon releases during construction has increased dramatically subsequent to adopting the push method, resulting in safety hazards as well as large costs and penalties for repairs on site. The method disclosed in the Sorkin patents, functionally and by specification, requires special equipment and much higher forces to make a connection (seat an anchor) by pushing rather than pulling.

More recently, a device has been developed that can grip tendons and reliably pull-seat anchorages, utilizing a much shorter length of bare strand than prior pull-seating equipment. However, a challenge remains regarding the attachment of sealing components to the anchor after the seating process. Due to the stringent requirements for liquid-tight sealing against intrusion of corrosive and other elements, the sealing components are extremely close-fitting and difficult to attach after pull-seating. Various hand tools and lubricants have been used, but remain unreliable, inefficient, and hazardous.

There is a need for anchorage assembly methods and apparatus that can effectively affix liquid-tight sealing components to a fixed end post tension anchor.

SUMMARY

One aspect of the present disclosure is a cap and tube or seal setting apparatus. An apparatus according to this aspect of the disclosure comprises an anchor holding fixture having a surface for receiving a post tension anchor. An actuator is mounted to a support base and is disposed on one side of the anchor holding fixture. The actuator has a movable part thereof disposed toward the anchor holding fixture. A tube or seal holding fixture is mounted to the support base and disposed on an opposed side of the anchor holding fixture to the actuator.

In some embodiments, the actuator comprises at least one of a hydraulic or pneumatic cylinder and ram combination, or a motor, jackscrew and ball nut combination.

In some embodiments, the anchor holding fixture is linearly moveably connected to either the support base or the tube or seal holding fixture.

In some embodiments, linear movable mounts for the anchor holding fixture comprise at least one pin fixedly coupled to the anchor holding fixture and extending through corresponding openings in the tube or seal holding fixture.

Some embodiments further comprise a spring disposed about the at least one pin, the spring providing force to urge the anchor holding fixture away from the tube or seal holding fixture.

In some embodiments, the tube or seal holding fixture is fixedly mounted to the support base.

Some embodiments further comprise a controller operatively connected to the actuator, the controller operative to cause operation of to the actuator in a predetermine sequence.

Some embodiments further comprise a cap setter coupled to the die, the cap setter comprising an opening for receiving a cap.

Another aspect of the present disclosure is a cap and tube or seal setting apparatus. An apparatus according to this aspect comprises an anchor holding fixture having a surface for receiving a post tension anchor. An actuator is mounted to a support base and is disposed on one side of the anchor holding fixture. A movable part of the actuator is disposed toward the anchor holding fixture. A cap setter is coupled to the support base on a side of the anchor holding fixture opposed to the actuator, the cap setter comprising an opening in a cap setting surface thereof for receiving a cap.

In some embodiments, the actuator comprises at least one of a hydraulic or pneumatic cylinder and ram combination, a motor, or a jackscrew and ball nut combination.

In some embodiments, the cap setter is fixedly mounted to the support base.

Some embodiments further comprise a tube or seal holding fixture disposed on a side of the actuator opposed to the anchor holding fixture.

In some embodiments, the tube or seal holding fixture is movably mounted to the anchor holding fixture.

In some embodiments, linear movable mounts for the tube or seal holding fixture comprise at least one pin fixedly coupled to the anchor holding fixture and extending through corresponding openings in the tube or seal holding fixture.

Some embodiments further comprise a spring disposed about the at least one pin, the spring providing force to urge the anchor holding fixture away from the tube or seal holding fixture.

Some embodiments further comprise a controller operatively connected to the actuator, the controller operative to cause operation of to the actuator in a predetermine order.

Another aspect of the present disclosure is a method for assembling a cap, and a tube or seal to a post tensioning anchor. A method according to this aspect comprises inserting the cap and the tube or seal, and the anchor into a cap and tube or seal setting apparatus. The apparatus comprises an anchor holding fixture having a surface for receiving the anchor; an actuator mounted to one side of the anchor holding fixture, the actuator having a cap setter attached to a movable part of the actuator; a tube or seal holding fixture mounted to a base on an opposed side of the anchor holding fixture; and an actuator having a fixed part attached to the base. The actuator is extended to urge the cap into the anchor and the anchor onto the tube or seal. Extending the actuator continues to urge the cap and the anchor toward the tube or seal until the anchor is connected to the tube or seal. The actuator is then retracted until the assembled cap, anchor and tube or seal is removable from the anchor holding fixture.

Some embodiments further comprise inserting another cap, another tube or seal and another anchor into the cap and tube or seal setting apparatus, extending the actuator until the another cap and the another tube or seal are connected to the another anchor, and retracting the actuator after until the another cap and the another tube or seal are connected to the another anchor.

A method for assembling either a cap, or a tube or seal to a post tensioning anchor according to another aspect of the present disclosure includes inserting either, (i) the cap or (ii) the tube or seal, and the anchor into a setting apparatus. The apparatus comprises an anchor holding fixture having a surface for receiving the anchor, an actuator having a fixed part mounted a base on one side of the anchor holding fixture, and having either (i) a cap setter attached to a movable part of the actuator or (ii) a tube or seal holding fixture attached to the movable part of the actuator. The tube or seal holding fixture is mounted to the base on an opposed side of the anchor holding fixture as the cap setter. The actuator is extended to either (i) urge the cap into the anchor or (ii) urge the tube or seal onto the anchor. The actuator is then retracted until the assembled cap and anchor or the assembled tube or seal and anchor is removable from the anchor holding fixture.

Other aspects and possible advantages will be apparent from the description and claims that follow.

DETAILED DESCRIPTION

Figure 1:
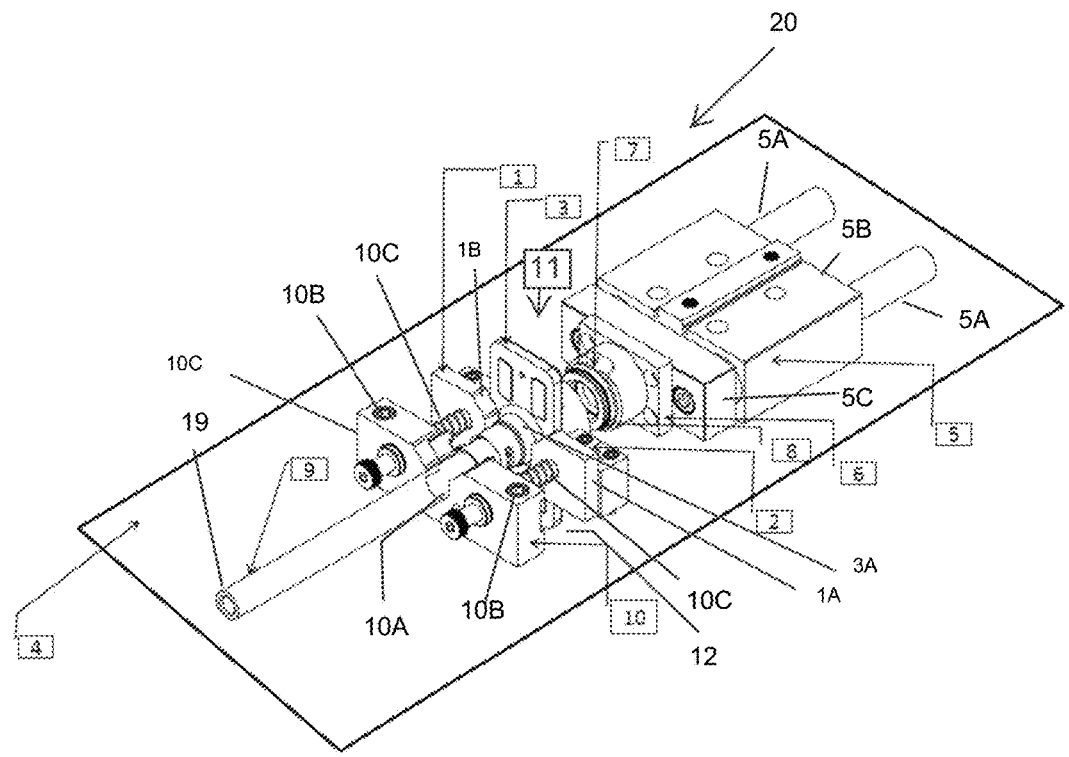
FIG. 1 shows a perspective view of an anchor, cap, and tube/seal disposed in an example embodiment of an apparatus according to the present disclosure.
Figure 2:
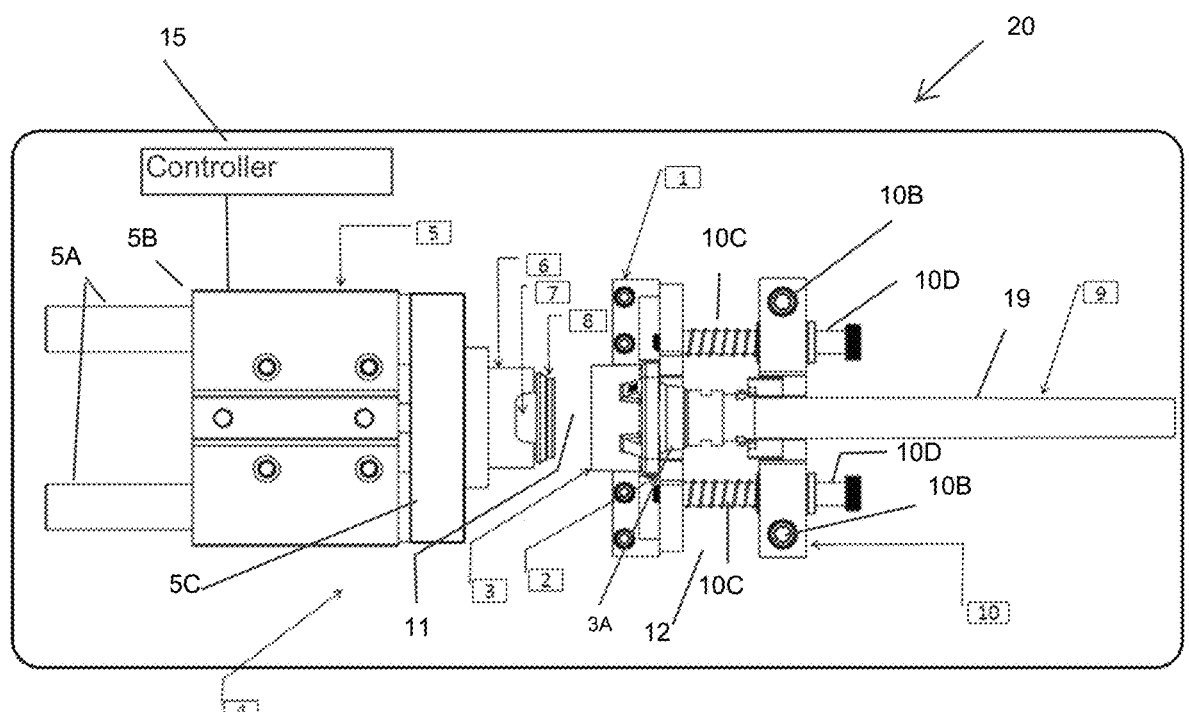
FIG. 2 shows a top view of the example embodiment of FIG. 1.

An example embodiment of an apparatus for attaching caps, and tubes or seals, to a post tensioning anchor, e.g., a an encapsulated anchor, will be explained with reference to FIGS. 1 and 2 which show views of the apparatus as it would operate to assemble components for an encapsulated post-tension tendon. Like reference numerals in the various views are used to identify like components of the apparatus and the devices on which the apparatus operates. Individually, FIG. 1 shows a perspective view of a sealing cap ("cap") 8, a post tension anchor ("anchor") 3, and a sealing tube ("tube") 9 disposed in an example embodiment of an assembly apparatus 20 according to the present disclosure. FIG. 2 shows a top view of the example embodiment of FIG. 1 from above the apparatus 20.

The apparatus 20 may comprise components, explained in more detail below, associated with an anchor holding fixture 1. The anchor holding fixture 1 may comprise a block 1A having an opening 1B therein. The anchor holding fixture 1 provides a surface 2 on which an anchor 3 (e.g., a post tension anchor), which may be an encapsulated anchor, may be placed for attachment of a cap, and a tube or seal. The opening 1B may be sized to enable passage therethrough of part of the anchor 3A while holding the remainder of the anchor 3 by reason of the surface 2. The anchor holding fixture 1 may be movably coupled to a support base 4. Such movable coupling may be to a fixed (stationary) element attached to the support base 4. In the present example embodiment the fixed element may be a tube or seal holding fixture 10 as will be further explained below. An actuator 5 may have a fixed part, e.g., an actuator housing 5B attached to the support base 4, and a movable part, such as a die 5C, movably coupled to the housing 5B by one or more linear motors 5A. The one or more linear motors 5A may be any device that provides or imparts linear motion to the die 5C with respect to the actuator housing 5B. In some embodiments, the die 5C may have a cap setter 6 affixed to one the side of the die 5C disposed toward the anchor holding fixture 1. The linear motor(s) 5A each may be, for example and without limitation, a hydraulic or pneumatic cylinder and ram combination, or a rotary motor, jack screw and ball nut combination. The actuator 5 imparts linear motion to the die 5C and in some embodiments, the cap setter 6 when the actuator 5 is operated. The cap setter 6, in embodiments that comprise it, may itself comprise an internal opening 7, which may be referred to as a "cap socket", and is arranged to receive a cap 8. The cap 8 may be, for example, a type used to sealingly close a fixed end anchorage in an encapsulated anchor system.

When the actuator 5 is fully retracted, the die 5C, and in some embodiments the cap setter 6, may be spaced apart from the anchor holding fixture 1 to provide a space 11 of sufficient size to accept the placement on the anchor holding fixture 1 of an "assembled anchor" (i.e., the anchor 3 having a tendon passing therethrough with wedges and a protruding tendon tail, such that the wedges are seated in the anchor 3 and the tendon is thereby retained in the anchor 3). The actuator 5 may be extended to seat the cap 8 on one side of the anchor 3, and as will be further explained, to seat a tube or seal 9 on the opposed side of the anchor 3. The actuator 5 may then be retracted to open the space 11. By repeatedly extending the actuator 5, and then retracting the actuator 5 after seating a cap (e.g., cap 8) on an anchor (e.g., 3), and the anchor on a tube or seal (e.g., at 9), the cap, and tube or seal setting operation may be repeated on each of a plurality of such assembled anchors.

The opposed side of the anchor holding fixture 1 may be movably coupled to the tube or seal holding fixture 10, which is itself fixedly coupled to the support base 4, as previously explained. Such movable coupling may be obtained by pins or bolts 10D, which may be rigidly coupled to the anchor holding fixture 1 and movably extend through corresponding openings in the tube or seal holding fixture 10. The tube or seal holding 10 fixture may be rigidly coupled to the support base 4, using, for example, cap screws, rivets, pins or the like, shown at 10B. The tube or seal holding fixture 10 may comprise a block 10C having a groove, slot or similar opening 10A on one side to enable insertion therethrough of the tube or seal 9, while having a dimension that retains the tube or seal 9 longitudinally within the opening 10A against force applied by the anchor 3 when the anchor 3 is moved toward the tube or seal holding fixture 10.

Attachment of the cap 8 and the tube or seal 9 to the anchor 3 may, in the present example embodiment, be performed entirely by the linear motion of the actuator 5. The actuator 5 may urge the die 5C and the cap setter 6 longitudinally in the direction of the anchor holding fixture 1, wherein the anchor 3 may cooperate with the cap setter 6 to secure the cap 8 into the anchor 3 as explained above. Linear movement of the actuator 5 toward the anchor holding fixture 1 may continue after the cap 8 contacts or is seated in the anchor 3. Continued movement of the actuator 5 urges the die 5C and the cap setter 6 against the anchor 3, and as a result the anchor holding fixture 1 moves the anchor 3 and the anchor holding fixture 1 toward the tube or seal holding fixture 10. A part of the anchor 3 adapted to receive the tube or seal 9 (such as a locking feature in encapsulation on the anchor 3) is thereby urged into the open end of the tube or seal 9, which itself is held in place by the tube or seal holding fixture 10. In this way, the cap 8 may be securely coupled to one side of the anchor 3, and the tube or seal 9 may be securely coupled to the other side of the anchor 3 in a single operation of the actuator 5.

After the attachment operation described above is completed, the actuator 5 may be retracted. When the actuator 5 is retracted, the anchor holding fixture 1 may be urged apart from the tube or seal holding fixture 10 by springs 10C disposed about the pins 10D. The springs urge the anchor holding fixture 1 such that: (i) a predetermined amount of force may be applied by the cap setter 6 to the anchor 3 before the anchor 3 and the anchor holding fixture 1 are moved toward the tube or seal holding fixture 10, and (ii) when the actuator 5 (and consequently the cap setter 6) is retracted, the anchor holding fixture 1 returns to its rest position as shown in the figures such that another tube or seal 9 may be inserted through an open space 12 between the anchor holding fixture 1 and the tube or seal holding fixture 10. The foregoing motion enables the user to repeat the tube or seal attachment operation on another anchor/wedge/tendon assembly. The foregoing operation may be repeated as often as desired to assemble additional anchors.

The actuator 5 may be controlled by a controller 15 (shown in FIG. 2 only), which may be a microprocessor, microcontroller, programmable logic controller, field programmable gate array, or any combination of mechanical switches and timers that may cause operation of the foregoing actuators in a predetermined sequence, to be explained further below. The controller 15 may have its own operation started, modified and/or stopped by a human operator interface of any type suitable for the particular type of controller.

In a method for attaching caps, tubes, seals and the like to an anchor, e.g., an encapsulated anchor for a post tensioning tendon, the following actions may be performed. The method may be used to pre-assemble a fixed-end anchor to a tendon, and subsequently enclose the anchor with a cap and tube or seal, for later use of the assembled fixed-end anchorage in reinforcing a concrete structure.

The post-tensioning tendon may be cut or otherwise fabricated to the proper length for the particular concrete structure into which it is to be affixed, and may be wound into a coil or other suitable shape for transportation by tying, banding or clamping. The tendon is not shown in the drawings for clarity of the illustration.

A predetermined length (e.g., approximately 3 inches) of a sheath 19 on the exterior of the tendon may be removed from one end (which may extend from the coil or other shape) of the tendon using any known automatic or manual stripping device. A seal or tube 9, that may comprise a locking connector or other device to secure the seal or tube 9 to the encapsulation on the anchor 3, is threaded onto the tendon from the sheath-stripped, free end of the tendon.

The anchor 3 and stripped-end tendon may then be assembled in a wedge setting apparatus as follows. Either the encapsulated anchor 3 is threaded onto the stripped end of the tendon, and the tendon end is set into the wedge seating apparatus; or the encapsulated anchor 3 is set into the wedge setting apparatus, and the stripped tendon end is inserted through the anchor 3. A set of wedges are attached to the wedge setting apparatus or to the tendon. The wedge setting apparatus operator may enter a command and/or operate a switch or control to start an automated sequence performed by the wedge setting apparatus which applies force to the tendon and wedge in opposition to the anchor, thereby assembling the tendon to the anchor to a predetermined tension force on the tendon. The foregoing description of assembly in a wedge setting apparatus is provided only as an example of pre-assembly of a tendon to an anchor and is not a limit on the scope of the present disclosure. An apparatus and method according to the present disclosure may be used in connection with an anchor apart from assembly of such anchor to a tendon.

Subsequent to assembling of the wedges, anchor, and tendon, the assembly is removed from the wedge setting apparatus and an operation to assemble a cap and tube or seal to the assembled wedge and tendon may begin in the apparatus 20 according to the present disclosure.

The assembled tendon, anchor and wedges are inserted into the cap, seal and tube seating apparatus 20 disclosed herein, with the anchor 3 positioned on the anchor holding fixture 1. In some embodiments, the cap 8 is placed into the cap socket 7 of the cap setter 6. The actuator 5 is then operated to cause the die 5C and the cap setter 6 to move toward the anchor 3, thereby inserting the cap 8 to the proper position in the anchor 3. The foregoing action may seat the cap 8 onto the anchor 3.

The actuator 5 continues moving thereby urging the die 5C, the cap setter 6 (and if so provided, the cap 8) and the anchor 3 toward the tube or seal 9 retained within the tube or seal holding fixture 10. Such continued movement closes the anchor 3 against the tube or seal 9. The actuator 5, and consequently the die 5C and the cap setter 6 then retract. The anchor holding fixture 1 will move away from the tube or seal holding fixture 10 by action of the springs 10C until the anchor holding fixture 1 is fully extended away from the tube or seal holding fixture 10, after which the die 5C and the cap setter 6 will move away from the anchor 3 to enable removing the capped, sealed anchor/tendon/wedge assembly (anchorage) from the cap, seal and tube seating apparatus 20. The foregoing operation may be repeated as needed for any selected number of anchors, tendons, wedges, and caps and tubes or seals to be assembled for use as fixed end anchored reinforcing tendons in a post tension reinforced concrete structure. In some embodiments, the same apparatus 20 as described herein may be used to assemble only a cap to an anchor, assemble only a tube or seal to an anchor, or assemble a cap and a tube or seal to an anchor.

The foregoing embodiment of an apparatus and method according to the present disclosure are described in terms of the cap setter 6 and the die 5C being affixed to the movable part of the actuator 5, wherein the tube or seal holding fixture 10 is fixedly mounted to the support base 4. It will be appreciated by those skilled in the art that the same actions to seat a cap and a tube or seal, or to seat the cap and the tube or seal individually to an anchor may be obtained with equal effect using an embodiment of the apparatus wherein the tube or seal holding fixture 10 is coupled to an actuator (which may be a similar type to the actuator 5 described herein). The movably mounted cap or seal holding fixture 10 may also be movably mounted to the anchor holding fixture 1. In such embodiments, the cap setter 6 may be fixedly mounted to the support base, such that operation of the actuator 5 moves the tube or seal setting fixture 10 toward the anchor holding fixture, and subsequently moves both toward the cap setter 6.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments may be combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A cap and tube or seal setting apparatus, comprising:
   an anchor holding fixture having a surface for receiving a post tension anchor, the anchor holding fixture comprising a block having an opening therein sized to enable entry therein of part of the post tension anchor while contacting another part of the anchor on the surface to limit motion of the anchor, the anchor holding fixture movably mounted to a tube or seal holding fixture fixedly mounted to a support base;
   an actuator mounted to the support base and disposed on one side of the anchor holding fixture, the actuator having a movable part thereof disposed toward the anchor holding fixture, a fixed part of the actuator mounted fixedly to the support base;
   wherein the tube or seal holding fixture comprises a block mounted to the support base and disposed on an opposed side of the anchor holding fixture to the actuator, the block having an opening sized to enable passage therethrough of a tube or seal while retaining the tube or seal longitudinally;
   wherein when the movable part of the actuator is retracted toward the fixed part, a space exists between the movable part and the anchor holding fixture enabling inserting the post tension anchor therein;
   wherein the anchor holding fixture is moveably mounted to the tube or seal holding fixture by at least one pin fixedly coupled to the anchor holding fixture and extending through at least one corresponding opening in the tube or seal holding fixture; and
   a spring disposed about the at least one pin, the spring arranged to provide force to urge the anchor holding fixture away from the tube or seal holding fixture.

2. The apparatus of claim 1 wherein the actuator comprises at least one of (i) a hydraulic or pneumatic cylinder and ram combination, or (ii) a motor, jackscrew and ball nut combination.

3. The apparatus of claim 1 further comprising a controller operatively connected to the actuator.

4. The apparatus of claim 1 wherein the actuator further comprises a cap setter coupled to a die attached to the movable part and oriented toward the anchor holding fixture, the cap setter comprising an opening for receiving a cap.

\* \* \* \* \*